E. F. KINGSBURY.
SPOOL CENTERING DEVICE.
APPLICATION FILED JULY 23, 1920.
1,402,167.
Patented Jan. 3, 1922.
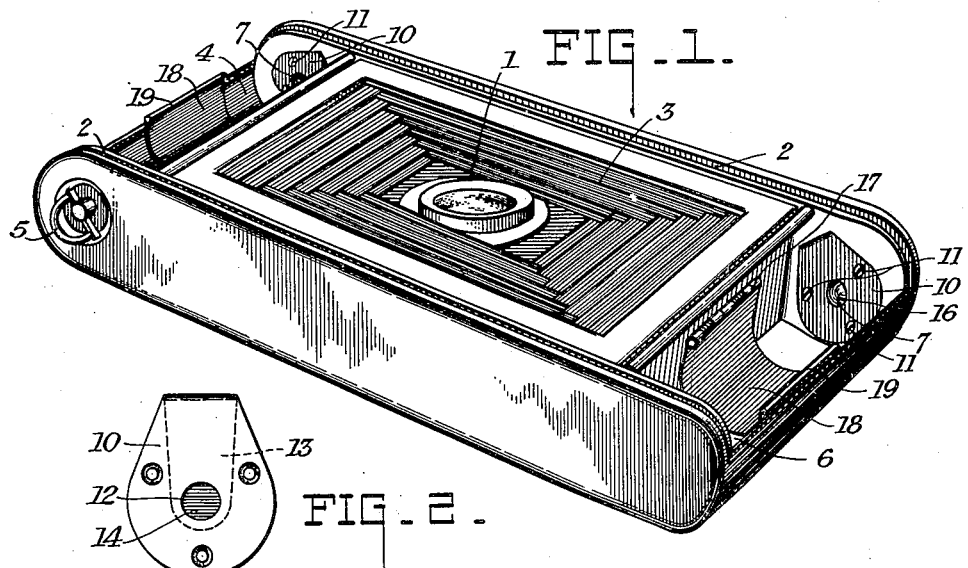
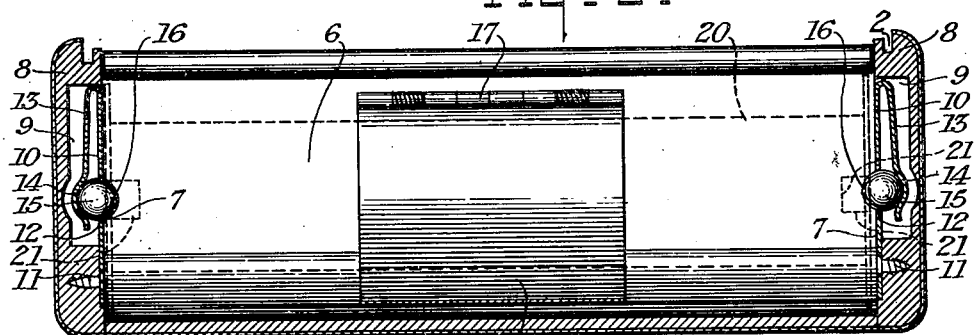
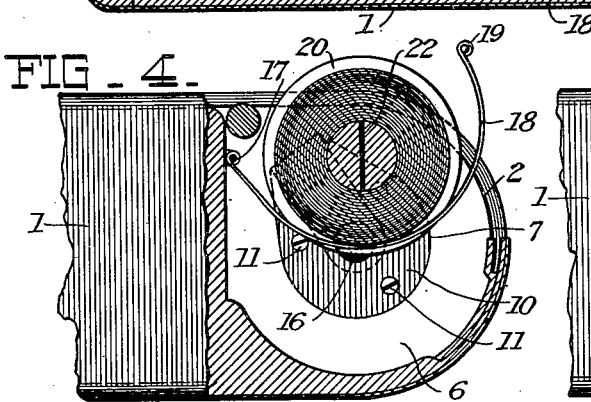
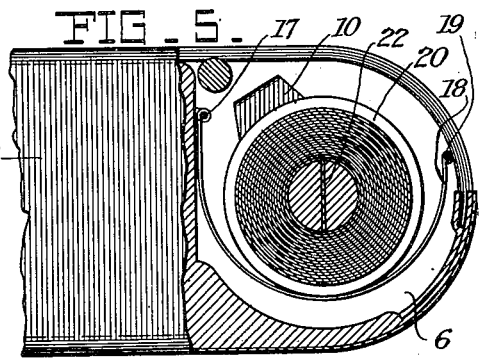
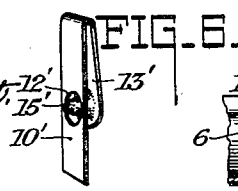
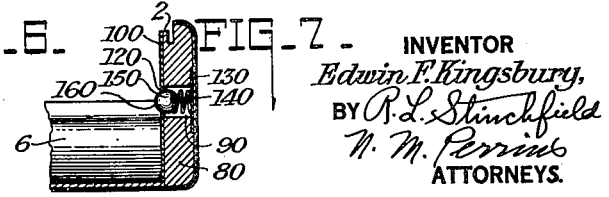
WITNESSES:
INVENTOR
Edwin F. Kingsbury,
BY
ATTORNEYS.

UNITED STATES PATENT OFFICE.

EDWIN F. KINGSBURY, OF RUTHERFORD, NEW JERSEY, ASSIGNOR TO EASTMAN KODAK COMPANY, OF ROCHESTER, NEW YORK, A CORPORATION OF NEW YORK.

SPOOL-CENTERING DEVICE.

1,402,167.  Specification of Letters Patent.  Patented Jan. 3, 1922.

Application filed July 23, 1920. Serial No. 398,449.

*To all whom it may concern:*

Be it known that I, EDWIN F. KINGSBURY, a citizen of the United States of America, residing at Rutherford, in the county of Bergen and State of New Jersey, have invented certain new and useful Improvements in Spool-Centering Devices, of which the following is a full, clear, and exact specification.

This invention relates to an improved centering and supporting means for a film spool as used in a camera.

The object of my invention is to provide such a means which will permit the insertion and removal of the spool with the greatest possible ease, which will be automatic in its operation, by which I mean that the mechanism itself will require no attention or manipulation but the mere insertion of the spool will result in its being correctly supported and centered, and the application of force to remove it will cause it to be disconnected and removed from the centering means. A further object is the provision of such a device which will be simple and inexpensive to manufacture, will require the minimum skill or care to operate, will be positive in action, will hold the spool definitely in a properly centered position, with sufficient friction to prevent its accidental rotation yet permitting it to rotate readily under slight strain. These and other objects I attain by the structure which is exemplified in the accompanying drawings in which—

Fig. 1 is a perspective view of a camera without the back, showing the spool chambers;

Fig. 2 is a plan of a spring member used in my preferred form of spool center;

Fig. 3 is a section through a spool chamber having my improved centering means and showing a spool in dotted lines therein;

Fig. 4 is a fragmentary section of the end of a camera, showing a spool partially ejected from the spool chamber;

Fig. 5 is a fragmentary section of the end of a camera showing a spool seated in operative position therein;

Fig. 6 is a perspective view of a modified form of spring and centering means;

Fig. 7 is a fragmentary section showing another embodiment of my invention.

1 indicates a folding roll film camera of familiar design, the back being removed but normally positioned on the seat 2. The bellows 3 are shown in folded position within the camera. At each end of the camera is a spool chamber, the one designated 4 being adapted to contain the take-up film spool and having at one of its ends a winding key 5 of familiar construction and design, and the one designated 6 being adapted to contain the supply spool. At the end of chamber 4 opposite the key 5, and at each end of chamber 6 is located one of my improved supporting and centering means 7.

In the preferred embodiment of my invention the wall 8 at the end of the compartment has a recess 9 therein. A piece of sheet metal of tapering form is bent into U shape the broad leg 10 of the U serving as a cover to the recess 9 and being attached to the material of the wall by any suitable means such as screws 11. In this leg is a round aperture 12. The other leg 13 is situated within the recess and it has a rounded concave seat 14 formed therein, in alignment with the aperture 12. A round ball 15 preferably of steel is seated in the aperture 12 and seat 14 and held by them in place. The U-shaped member is naturally resilient, being of brass, steel or other resilient sheet metal, so that the leg 13 serves as a spring tending to push the ball into the aperture 12 through which it partially extends as indicated at 16.

In the modified form shown in Fig. 6, the U-shaped member has a front leg 10′ having an aperture 12′, and a resilient rear leg 13′ having a rounded protuberance 15′ struck out from the material thereof and extending partially through the aperture 12′. The form shown in Fig. 7 has a recess 90 in the wall 80. A front plate 100 with an aperture 120 is provided and a rear plate 130. A coil spring 140 tends to force the ball 150 forwardly and partially through the aperture 120 as indicated at 160. The functions of the parts in these modifications are the same as those of analogous parts in the preferred form.

Mounted by means of a spring hinge 17 in the chamber 6 is the ejecting means 18. This is normally spring pressed by the hinge into the chamber. It consists of a sheet metal strip, the end 19 of which serves as a handle. Its use will appear hereinafter.

In operation, the user takes a film spool 20 and thrusts it in the chamber in a direction at right angles to its axis and to the axis of the chamber. The advancing edges of the flanges contact the rounded surfaces of the protuberances, whether they be balls or integral with the sheet metal springs, and force them back against spring pressure into the recesses, where they remain in inoperative position while the flat surfaces of the end flanges pass over them. The spools used have axial end recesses 21, and when these come in registry with the protuberances, the latter spring forward and engage therein. As the protuberances are in proper alignment, they accurately center the film spool so that its axis is in proper position with reference to the camera parts. They press forward with enough spring pressure so that the spool is held frictionally against accidental turning; but, nevertheless, lightly enough so that when the wind-up spool is turned the slight pull on the film is sufficient to turn the supply spool readily upon the protuberances as axes.

An empty spool is placed in the compartment 4, it being necessary during insertion to draw out the winding key 5, which is of the usual structure being spring pressed into engagement with a slot in the spool. The spool is centered at the other end by my improved device in the manner already described. An ejecting means 18 is also placed in this chamber. The end of the backing paper is threaded into the usual slot 22 in the spool and the film used in the customary manner. When the film has been used and wound upon the take-up spool, the two spools are removed from the chambers. This is done by grasping the ends 19 of the ejecting means and pulling directly up. Pressure is thus exerted upon the middle of the spool; and the edge of the axial end opening thereof, bearing against the rounded surface of the ball or other protuberance, causes the same to be retracted into inoperative position, permitting the spool to be smoothly withdrawn by the mere exertion of pressure thereon, sufficient to force the ball back. In withdrawing the spool from compartment 4, it is, of course, necessary first to retract the winding key from engagement therewith. In Fig. 4, a full spool is shown being withdrawn from the compartment.

Considering the spring pressed ball or other protuberance as a mechanism adapted to cooperate with a corresponding part on the spool it is evident that it is in a normal or operative position, when the compartment is empty or when a spool is properly centered therein, and that it is caused to be moved automatically to a retracted or inoperative position by the insertion of a spool into the chamber or by its withdrawal therefrom; and that it is caused to be moved automatically to resume its normal position by the proper centering of the spool or its complete withdrawal. I consider as within the scope of my invention any automatically cooperating mechanisms on the spool and the camera which are thus operated by the mere act of insertion of the spool to support the spool in a properly centered position.

Having thus described my invention, what I claim as new and desire to secure by Letters Patent is:

1. A camera having an elongated spool compartment, a rounded bearing member at one end thereof, spring pressed toward the central portion of the compartment, and adapted to be readily thrust to a retracted position by the engagement therewith of the edge of a flange of a film spool being inserted into position when said flange is being moved substantially perpendicularly to the length of the compartment, and to automatically seat itself in the central end aperture of said spool when properly positioned in the compartment.

2. A camera having a spool compartment, the end wall of which is recessed, a spring pressed, rounded bearing member carried in said recess and partially protruding therefrom and adapted to frictionally engage the apertured end of a spool in said compartment.

3. A camera having a spool compartment the end wall of which is recessed, an apertured cover plate for said recess, a ball of greater diameter than the aperture in said plate and held in place in the recess by the cover plate and spring pressed to protrude partially through the aperture to engage frictionally the apertured end of a spool in said compartment.

4. In a camera, a spool chamber having opposite end walls, spool supporting and centering means on said walls and having a retracted and an operative position and normally occupying the operative position, but adapted to be moved automatically by the spool to retracted position when a spool is being inserted into or removed from the chamber and to move automatically to operative position when the spool is properly centered, or when it is entirely removed from said chamber.

5. In a camera, a spool chamber having opposite end walls, spool supporting and centering means on both said walls having a retracted and an operative position, and normally occupying the operative position, but adapted to be moved automatically by the spool to retracted position when a spool is being inserted into the chamber and to be moved automatically to operative position to support and center the spool when the spool is properly positioned in said chamber.

6. In a camera, a spool chamber having opposite end walls, rounded spool centering protuberances mounted on both said walls in axial alignment and spring pressed outwardly therefrom, whereby the protuberances will be pressed back when engaged by the edges of the ends of a spool being inserted into the chamber in a direction perpendicular to its axis but will spring forwardly into engagement with axial apertures in the spool when in registry therewith to support said spool rotatably in a properly centered position.

7. The combination with a film spool of a camera having a compartment for holding said spool, the end walls of the compartment and the ends of the spool having cooperating centering means, whereby the spool is axially and rotatably mounted, the said means having a resilient engagement one with the other whereby the spool may be inserted into proper position and be held therein by a single movement perpendicular to its axis and may be withdrawn therefrom by a similar movement.

8. The combination with a spool of film of a camera having a chamber adapted to seat said spool, the ends of the spool having centering means located axially thereof, and the camera chamber having centering means adapted to engage the centering means on the spool ends, the two centering means being arranged and constructed to engage one another automatically by the thrusting of the spool into the chamber in a direction perpendicular to its axis, so that the spool is supported thereby for rotation.

9. The combination with a film spool having axial apertures in its ends of a camera having a spool chamber with opposite end walls having recesses therein, cover plates over said recesses, each cover plate having an aperture therein, balls held in said recesses by the cover plates and of larger diameter than said apertures and spring pressed to protrude partially therethrough to form aligned bearing members engaging frictionally in the apertures of the spool ends and rotatably supporting the spool in propedly centered position with respect to the camera parts.

10. A camera having a film spool compartment, the opposite end walls of which are recessed, a U-shaped metal member in each of said recesses, one leg of which is apertured and serves as a cover plate for the recess and the other leg of which acts as a spring, a ball between the legs and spring pressed by the second leg partially through the recess in the first, the two balls thus protruding into the compartment to form aligned bearing members adapted to resiliently engage and rotatably support an inserted film spool.

11. In a camera, a spool chamber, opposite aligned means movable to operative and inoperative position, and adapted when in operative position to engage the opposite ends of a film spool to support the same in a properly centered position, and operative automatically to assume such operative position upon the insertion of a spool into the chamber.

12. In a camera, a spool chamber, opposite aligned members movable toward and from one another to operative and inoperative positions, and adapted when in operative position to engage axially the opposite ends of a film spool to support the same in a properly centered position, and operative automatically to assume such operative position upon the insertion of a spool into the chamber.

13. In a camera, a spool chamber, opposite aligned means movable to operative and inoperative positions, and adapted when in operative position to engage the opposite ends of a film spool to support the same rotatably in a properly centered position, and operative automatically to assume such operative position upon the insertion of a spool into the chamber in a direction perpendicular to its axis.

14. In a camera, a spool chamber, means movable to operative and inoperative positions, and adapted when in operative position to engage a film spool to support the same in a properly centered position, and operative automatically to assume such operative position upon the insertion of a spool into the chamber and means by which the spool may be ejected from the chamber against the action of said spool engaging and centering means.

15. In a camera, a spool chamber, opposite aligned means movable to operative and inoperative positions and adapted when in operative position to engage the opposite ends of a film spool to support the same rotatably in a properly centered position and operative automatically to assume such operative position upon the insertion of a spool into the chamber in a direction perpendicular to its axis, and means for the ejection of such spool from the chamber said ejecting means being operative against the action of the engaging and centering means.

16. In a camera, a spool chamber, opposite aligned bearings movable toward and from one another to operative and inoperative positions and adapted when in operative position to engage axially the opposite ends of a film spool to support the same rotatably in a properly centered position and operative automatically to assume such operative position upon the insertion of a spool into the chamber in a direction perpendicular to its axis, and means for the ejection of such a spool from the chamber, whereby the bearings will be automatically disengaged from the spool ends and moved to inoperative position.

17. The combination with a film spool having axial apertures in its ends, of a camera having a spool chamber, and rounded bearing means in alignment and spring pressed toward one another and movable toward and from one another to operative and inoperative positions and resiliently engaging in said apertures in the spool when in operative position and supporting the spool rotatably in a properly centered position, and operative automatically to assume such operative position upon the insertion of said spool into the chamber in a direction perpendicular to its axis, and means for the ejection of the spool from the chamber whereby the bearings will be automatically disengaged from the spool ends and moved to inoperative position.

18. In a camera, a spool chamber, means movable to an operative and to an inoperative position and adapted when in operative position to co-operate with a film spool to support the same in a properly centered position and operative automatically to assume such operative position upon the insertion of a spool into the chamber, and operative automatically to be moved from operative position to inoperative position upon the removal of the spool from a properly centered position.

19. The combination with a film spool of a camera having a compartment for holding said spool, the end walls of the compartment and the ends of the spool having co-operating centering means, whereby the spool is axially and rotatably mounted, the said means having a resilient engagement one with the other whereby the spool may be inserted into proper position and be held therein by a single movement perpendicular to its axis and may be withdrawn therefrom by similar movement, a bearing surface adjacent said spool chamber, and means for drawing film from said spool over said bearing surface, the resilient engagement between the said centering means being sufficient to maintain the film taut and to hold the said centering means against disengagement when under tension from said drawing means in the direction of the bearing surface.

20. In a camera, a spool chamber having rigid end walls spaced to admit a suitable film spool, rounded protuberances in alignment at opposite ends of the chamber and extending in front of said walls, and springs pressing said protuberances toward one another, whereby the movement of a suitable spool into the chamber perpendicularly to its axis and to the length of the chamber will cause the edges of the spool flanges to contact the rounded protuberances and cause their automatic retraction toward the end walls sufficiently to permit the passage of the spool, and the spring pressure being adapted to cause the protuberances to engage suitable apertures in the spool ends.

21. In a camera, a spool chamber having rigid end walls spaced to admit a suitable film spool, rounded protuberances in alignment at opposite ends of the chamber and extending in front of said walls, and springs pressing said protuberances toward one another, whereby the movement of a suitable spool into the chamber perpendicularly to its axis and to the length of the chamber will cause the edges of the spool flanges to contact the rounded protuberances and cause their automatic retraction toward the end walls sufficiently to permit the passage of the spool, and the spring pressure being adapted to cause the protuberances to engage suitable apertures in the spool ends, the pressure being sufficient to hold the spool properly centered under ordinary camera tension, but preventing its accidental rotation.

22. In a camera, a spool chamber having rigid end walls, rounded protuberances at opposite ends of the chamber in axial alignment and spring pressed toward one another, whereby the protuberances will be automatically pressed away from one another when their rounded surfaces are simultaneously engaged by the edges of the flanges of a spool being inserted into the chamber in a direction perpendicular to its axis, the chamber being so dimensioned that the protuberances may be simultaneously retracted sufficiently to permit a spool to pass between them, and the protuberances being adapted to spring forwardly automatically to engage apertures in the spool ends when in registry therewith to support a spool rotatably in properly centered position.

Signed at N. Y. C. this 17th day of July, 1920.

EDWIN F. KINGSBURY.